US012748877B2

(12) United States Patent
Sundradhas et al.

(10) Patent No.: US 12,748,877 B2
(45) Date of Patent: Sep. 29, 2026

(54) GRANULAR LEVEL DOCUMENT SECURITY WITH ROLE-BASED ACCESS

(71) Applicant: Kyndryl, Inc., New York, NY (US)

(72) Inventors: Satheesh Thayal Sundradhas, Bangalore (IN); Balaji Subramanian, Bangalore (IN); Salna Unnikrishnan, Hyderabad (IN); Prakash Ramanujam, Bangalore (IN); Somak Banik, Bangalore (IN)

(73) Assignee: Kyndryl, Inc., New York, NY (US)

( * ) Notice: Subject to any disclaimer, the term of this patent is extended or adjusted under 35 U.S.C. 154(b) by 113 days.

(21) Appl. No.: 18/813,205

(22) Filed: Aug. 23, 2024

(65) Prior Publication Data

US 2026/0057090 A1 Feb. 26, 2026

(51) Int. Cl.
*G06F 21/62* (2013.01)

(52) U.S. Cl.
CPC ................................ *G06F 21/6218* (2013.01)

(58) Field of Classification Search
None
See application file for complete search history.

(56) References Cited

U.S. PATENT DOCUMENTS

| | | | | |
|---|---|---|---|---|
| 2011/0247081 | A1 | 10/2011 | Shelton | |
| 2017/0201526 | A1 | 7/2017 | Yehuda et al. | |
| 2019/0129968 | A1 | 5/2019 | Neylan et al. | |
| 2022/0108167 | A1* | 4/2022 | Upadhyay | G06N 3/0499 |
| 2022/0171871 | A1 | 6/2022 | Zhong et al. | |
| 2022/0309037 | A1* | 9/2022 | Gutierrez | G06F 16/16 |

* cited by examiner

*Primary Examiner* — Brandon Hoffman
(74) *Attorney, Agent, or Firm* — CANTOR COLBURN LLP; Erik Swanson

(57) ABSTRACT

Embodiments relate to providing granular level document security with role-based access. A technique includes determining, by a first artificial intelligence (AI) model, segments of a document and generating, by a second AI model, tags for the segments of the document, the tags being unique identifiers for the segments. The technique includes defining permissions for the tags in an access control table based on a plurality of identifications, an identification being in the plurality of identifications. The technique includes, in response to receiving the identification with a request to access the document, extracting the tags permitted for the identification from the access control table, and filtering the document according to the segments for the tags permitted for the identification. The technique includes, in response to the request to access the document, causing the document that is filtered to be rendered with the segments for the tags permitted for the identification.

20 Claims, 9 Drawing Sheets

FIG. 6

ACCESS CONTROL TABLE/LIST

| **DOCUMENT ID:** DOC 1 | | |
|---|---|---|
| **TAGS** | **USER ID** | **GROUP ID** |
| **1:** XYZ | END USER A, END USER B | GROUP 1, GROUP 2 |
| **2:** ABC | END USER B, END USER C | GROUP 1 |
| **3:** JQL | END USER A, END USER B, END USER C | GROUP 1, GROUP 2, GROUP 3 |
| ⋮ | ⋮ | ⋮ |
| **N:** LMN | END USER A, END USER B | GROUP 1 |

GRANULAR LEVEL DOCUMENT SECURITY WITH ROLE-BASED ACCESS

BACKGROUND

The present invention generally relates to computer systems, and more specifically, to computer-implemented methods, computer systems, and computer program products configured and arranged to provide granular level document security with role-based access using an artificial intelligence (AI) workflow.

Security software is designed to protect and secure servers, laptops, mobile devices, and networks from unauthorized access, intrusions, viruses, and other threats. Security software can protect data, users, systems, and organizations from a wide range of risks. Various data security controls can be utilized to protect data. Data security controls can include policies, procedures, and mechanisms used to protect data. Data security controls limit the of risk of data being lost, stolen, misused, or viewed by unauthorized personnel.

SUMMARY

Embodiments of the present invention are directed to computer-implemented methods for granular level document security with role-based access. A non-limiting computer-implemented method includes determining, by a first artificial intelligence (AI) model, segments of a document and generating, by a second AI model, tags for the segments of the document. The tags are unique identifiers for the segments. The method includes defining permissions for the tags in an access control table based on a plurality of identifications, where an identification is in the plurality of identifications. The method includes, in response to receiving the identification with a request to access the document, extracting the tags permitted for the identification from the access control table and filtering the document according to the segments for the tags permitted for the identification. The method includes, in response to the request to access the document, causing the document that is filtered to be rendered with the segments for the tags permitted for the identification.

Other embodiments of the present invention implement features of the above-described methods in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 6 depicts a block diagram of an example access control table according to one or more embodiments of the present invention;

DETAILED DESCRIPTION

Figure 1:
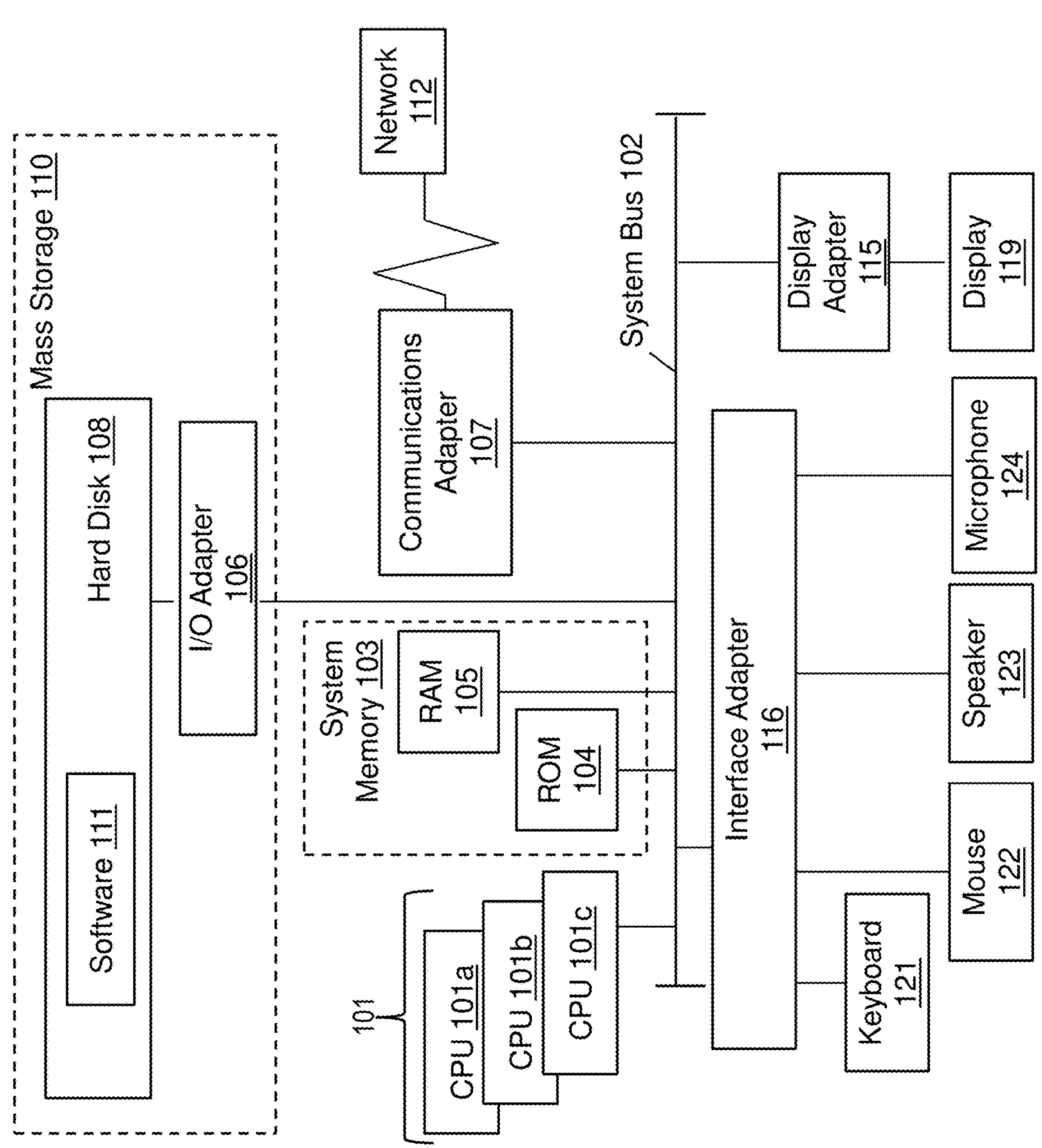
FIG. 1 depicts a block diagram of an example computer system for use in conjunction with one or more embodiments of the present invention.

One or more embodiments are configured and arranged to dynamically execute granular level document security with role-based access. One or more embodiments provide granular access control within documents using artificial intelligence (AI) algorithms, with a delineating access controls at the page level and/or section level within a document, as opposed to the entire document. Embodiments can utilize an AI technique for tagging individual pages, sections, headers, and/or custom-defined portions of a document to control access based on user permissions, group permissions, etc. Security and privacy are enhanced by restricting access to specific sections of a document solely to authorized individuals or groups. This technical improvement is valuable for organizations having sensitive information, ensuring that only authorized personnel have access to specific content, which provides a higher level of document security and management efficiency.

Current document security methods typically focus on protecting entire documents. These methods include password protection, encryption, digital signatures, access control lists (ACLs), watermarking, document tracking, and secure file transfer protocols. While these techniques provide a certain level of security, they do not provide the granularity required for precise access control within documents. For example, password protection restricts access to those who know the password, and encryption scrambles the document's contents requiring a decryption key for access. Digital signatures ensure authenticity and integrity but adds complexity, cost, and universal usage. ACLs manage permissions by specifying who can access, read, write, or modify the document but it becomes cumbersome and inefficient with scalability issues as the number of users, resources, and access rules increase. Watermarking embeds marks to indicate ownership or status and prevent unauthorized sharing. Document tracking systems monitor and log document activities and can be a used as a proactive and preventive measure but do not suffice for the purpose of document security. Secure file transfer protocols (SFTPs)

ensure encrypted transmission to reduce interception risks; however, setting up and configuring secure file transfer protocol servers and clients add complexity, performance overhead for large files or high-volume transfers, higher costs, and higher network dependency. Despite these measures, current document security mechanisms are limited in that they treat the document as a single entity. This means that once access is granted to the document, the user can view the entire document, including potentially sensitive or irrelevant sections. This all-or-nothing approach can result in unauthorized access to sensitive information, thereby posing significant security and privacy risks.

According to one or more embodiments, an aspect applies granular access control within documents. This method allows for individual pages, sections, headers, and/or custom-defined portions of a document to be tagged and secured separately. This ensures that only authorized personnel can access specific parts of the document, enhancing security and organizational control.

One or more embodiments can employ AI driven tags. By adding special AI driven tags to different parts of a document, the system ensures that only users with the appropriate access can view the tagged content. This granular access control addresses the technical problem of unauthorized access to sensitive information within documents (e.g., electronic documents). One or more embodiments use access control tables having a tagging mechanism that associates specific tags with a user or groups of user. Users can access only those portions of the document relevant to their roles or permissions. This precise access control mechanism reduces the risk of unauthorized data access and improves overall document management efficiency.

Further, one or more embodiments provide a refined and secure way to manage document access, thereby making it easier for organizations to control access and visibility to the document along with controlling precisely who can view specific content within the document. One or more embodiments allow document owners to define access/permissions at a much more granular level. This approach significantly enhances security and privacy, ensuring that sensitive information is accessible exclusively to individuals with the requisite authorization.

One or more embodiments described herein can utilize machine learning techniques to perform tasks, such as classifying a feature of interest. More specifically, one or more embodiments described herein can incorporate and utilize role-based decision making and artificial intelligence (AI) reasoning to accomplish the various operations described herein, namely classifying a feature of interest. The phrase “machine learning” broadly describes a function of electronic systems that learn from data. A machine learning system, engine, or module can include a trainable machine learning algorithm that can be trained, such as in an external cloud environment, to learn functional relationships between inputs and outputs, and the resulting model (sometimes referred to as a “trained neural network,” “trained model,” “a trained classifier,” and/or “trained machine learning model”) can be used for classifying a feature of interest, for example. In one or more embodiments, machine learning functionality can be implemented using an Artificial Neural Network (ANN) having the capability to be trained to perform a function. In machine learning and cognitive science, ANNs are a family of statistical learning models inspired by neural networks in nature. ANNs can be used to estimate or approximate systems and functions that depend on a large number of inputs. Convolutional Neural Networks (CNN) are a class of deep, feed-forward ANNs that are particularly useful at tasks such as, but not limited to analyzing visual imagery and natural language processing (NLP). Recurrent Neural Networks (RNN) are another class of deep, feed-forward ANNs and are particularly useful at tasks such as, but not limited to, unsegmented connected handwriting recognition and speech recognition. Other types of neural networks are also known and can be used in accordance with one or more embodiments described herein.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101*a*, 101*b*, 101*c*, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction are discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, a microphone 124, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, storage capability including the system memory 103 and the mass storage 110, input means such as the keyboard 121, the mouse 122, and the microphone 124, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
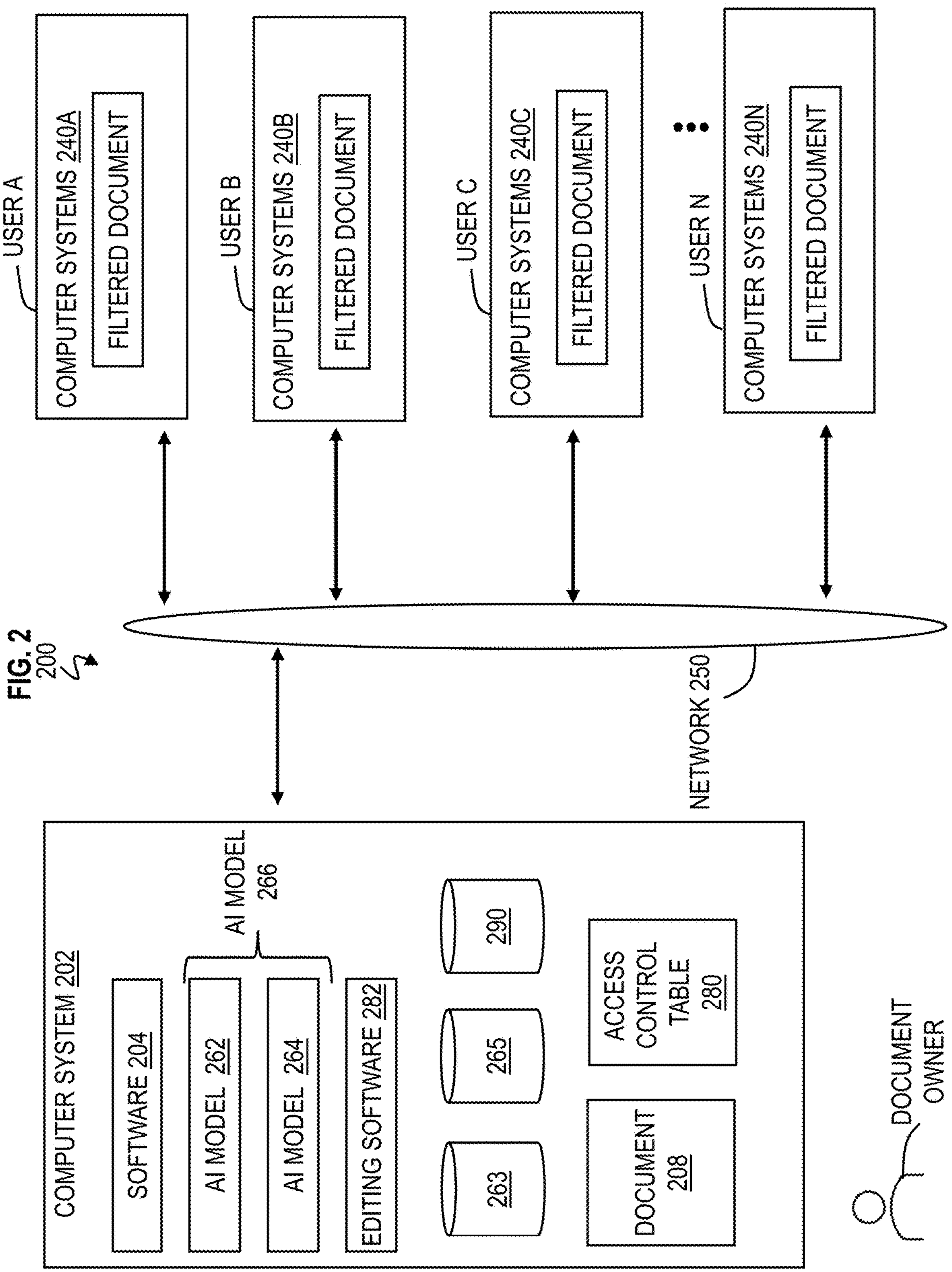
FIG. 2 depicts a block diagram of an example system configured to dynamically execute granular level document security with role-based access using an AI workflow according to one or more embodiments of the present invention.

FIG. 2 depicts a block diagram of an example system 200 configured to provide granular level document security with role-based access according to one or more embodiments. The new granular access control system for documents presents an innovative AI based solution. The granular access control system enhances security, privacy, and efficiency, making it a technological advancement for organizations having sensitive information.

The system 200 includes a computer system 202 configured to communicate over a network 250 with many different computer systems, such as a computer system 240A, a computer system 240B, a computer system 240C, through a computer system 240N. The computer system 240A, the computer system 240B, the computer system 240C, through the computer system 240N can generally be referred to as computer systems 240. The computer systems 240 may represent end user devices of user A, user B, user C, through user N.

As represented by computer systems 240, the user devices can be a personal computer or laptop. The user devices can be a mobile device such as a cellular phone or tablet, or a smart device. A smart device is an electronic device, generally connected to other devices or networks via different wireless protocols that can operate to some extent interactively. Several notable types of smart devices are smartphones, smart speakers, tablets, smartwatches, smart bands, smart glasses, and many others.

The network 250 can be a wired and/or wireless communication network, and the communication network includes a telecommunications network, the public switched telephone network (PTSN), voice over IP (VOIP) network, etc. The communication network includes cellular networks, satellite networks, etc.

The computer systems 240 can include various software and hardware components including software applications (apps) for communicating over the network 250 as understood by one of ordinary skill in the art. The software applications provide users with a way to access information, services, entertainment, etc. The computer systems 240 can include various software and hardware components designed to perform specific functions as discussed herein.

The computer system 202, computer systems 240 (e.g., user devices), software 204, artificial intelligence (AI) model 262, AI model 264, AI model 266, editing software 282, etc., can include functionality and features of the computer system 100 in FIG. 1 including various hardware components and various software applications such as software 111 which can be executed as instructions on one or more processors 101 in order to perform actions according to one or more embodiments of the invention. The software 204 can include, be integrated with, and/or call other pieces of software, algorithms, application programming interfaces (APIs), graphical user interfaces (GUIs) etc., to operate as discussed herein.

The computer system 202 may be representative of numerous computer systems and/or distributed computer systems configured to provide security services to users of the computer systems 240. The computer system 202 can be part of a cloud computing environment such as a cloud computing environment 50 depicted in FIG. 8, as discussed further herein.

Figure 3:
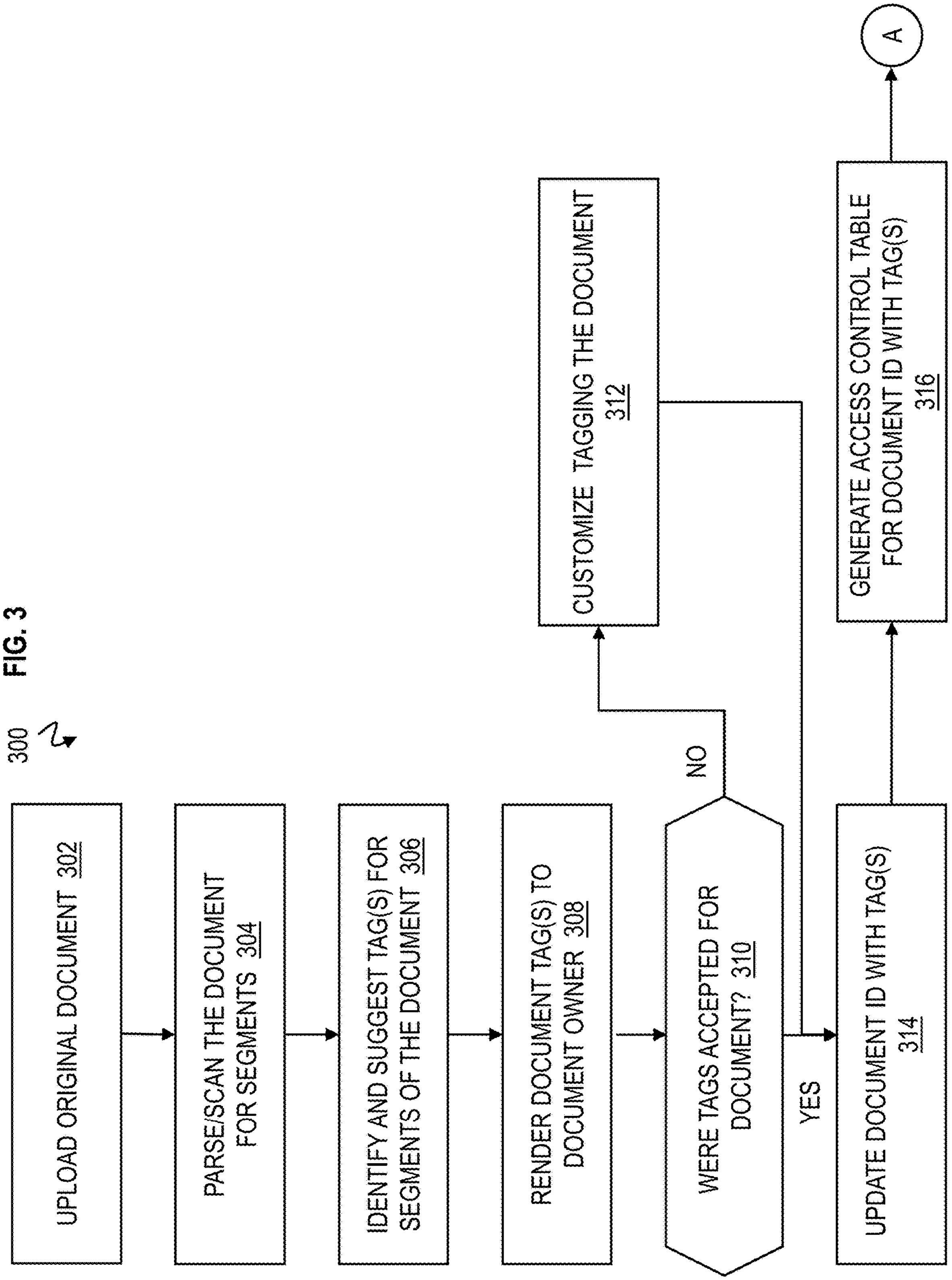
FIG. 3 is a flowchart of a computer-implemented method for dynamically providing granular level document security with role-based access according to one or more embodiments of the present invention.

As will be seen below, FIG. 3 illustrates an example process of how a document is updated and integrated into the system. It includes the AI workflow for analyzing document content, the customization process by the document owner, and the final tagging submission.

According to embodiments, document security implements granular, page-level access control using AI tagging. Unlike traditional document security methods that apply controls to entire documents, this system allows document owners to designate access permissions for specific sections, headers, pages, diagrams, etc., within a document, thereby enhancing the precision and security of document management. Embodiments can utilize AI based tagging and/or custom tagging where pages or sections are labelled according to the access requirements. Users with the appropriate permissions can view the relevant portions of the document while other users are restricted. This effectively prevents unauthorized access to sensitive information by ensuring that individuals (only) view the relevant portions of the document that are pertinent to their roles.

Turning to FIG. 3, a flowchart depicts a computer-implemented method 300 for dynamically (in real-time or near real-time) providing granular level document security with role-based access according to one or more embodiments. The computer-implemented method 300 can be executed by the computer system 202 on behalf of and in conjunction with the computer systems 240. Reference can be made to any figures discussed herein.

At block 302 of the computer-implemented method 300, the software 204 of computer system 202 is configured to receive and/or upload an original document 208. The document owner may upload the document 208, and the software 204 generates and assigns the document 208 a document identification (ID). The documents 208 is an electronic document capable of being rendered on a computer system. As an electronic document, the document 208 can include various types of media including audio and video. The document 208 can include text, tables, diagrams, etc. As an example, the document 208 may be a technical document, a government document, a financial document, etc.

At block 304, the computer system 202 is configured to parse/scan the document 208 for segments. The software 204 can parse/scan the document 208 and/or the software 204 can input the document 208 to AI model 262 to parse/scan the document 208 for segments. A segment represent any portion of the document 208. Examples of the segments includes pages, chapters, sections, headers, appendices, diagrams, charts, tables, video, audio, confidential (sensitive) information, an individual word, a phrase within a sentence, an individual sentence within a paragraph, numerical values, columns on a page, graphics, etc.

The AI model 262 is a machine learning model trained on training data 263 to predict, label, and/or classify segments in documents. The training data 263 are labeled, which means that the segments in documents are labeled/identified in advance to determine when the output of the AI model 262 predicts the correct label. The training data 263 may include numerous documents that have been previously labeled into segments. The training data 263 include feature vectors (i.e., features) utilized to train the AI model 262. The AI model 262 is a machine learning model trained on labeled training data 263 to predict, label, and classify document segments accurately. The training data 263 comprises numerous documents with pre-labeled segments, allowing the model to learn and validate its predictions against known labels. These training data include feature vectors that encapsulate various attributes of the document segments. Example features utilized to train the AI model 262 may include keyword frequency, header detection, font styles, semantic analysis, named entity recognition (NER), and metadata such as section titles and document metadata. These features enable the AI model 262 to discern and categorize different sections within a document effectively.

During the training phase, the predicted segments of each document predicted by AI model 262 are compared to labels/segments of the document in the training data to continuously improve the AI model 262. This allows the AI model 262 to learn the correct classification/segments for documents. In one or more embodiments, the AI model 262 may begin training, as discussed herein, from a pretrained model. A pretrained model is a model that has been trained on a large dataset and can be used as a starting point for other tasks. Once trained, the AI model 262 is configured to receive a document and output the predicted segments in the document.

At block 306, the computer system 202 is configured to identify and suggest tags for the segments of the document 208. When segments are found in the documents 208, the computer system 202 can suggest tags for segments including pages, chapters, sections, headers, appendices, diagrams, charts, tables, video, audio, confidential (sensitive) information, an individual word, a phrase within a sentence, an individual sentence within a paragraph, numerical values, columns on a page, graphics, etc.

A tag is a unique identifier for a segment in the document. The tag is linked to the segment. A tag is a unique identifier assigned to a specific segment within a document. This tag serves as a reference point, providing a direct link to the specific segment it identifies. Each tag is unique, allowing every segment to be distinctly identified and accessed. Tags may include metadata such as a segment type (e.g., header, section, appendix), confidentiality level, and/or other relevant attributes. The unique nature of tags facilitates precise access control, ensuring that users can access only the segments of the document for which they are authorized.

In one or more embodiments, the software 204 can include and/or access rules-based logic to identify and suggest tags for the segments found in the document 208. In one or more embodiments, the software 204 can input the identified segments and the document 208 to AI model 264, so that the AI model 264 identifies and suggests tags for the segments found in the document 208.

The AI model 264 is a machine learning model trained on training data 265 to generate tags for input segments in which the tags uniquely number and name segments in documents. The training data 265 are labeled, which means that the segments in documents are labeled/identified with tags in advance to determine when the output of the AI model 262 predicts the correct tag for each segment. The training data 265 may include numerous documents having segments previously labeled tags. The training data 265 include feature vectors (i.e., features) utilized to train the AI model 264. The AI model 264 is a machine learning model trained on labeled training data 265 to generate unique tags for document segments. The training data 265 include documents with pre-labeled segments, allowing the model to learn and validate its tagging accuracy. These training data include feature vectors that describe various characteristics of the segments. Example features utilized to train the AI model 264 may include text patterns, contextual keywords, structural elements (e.g., headers, footers), font styles and sizes, section breaks, and semantic context. These features enable the AI model 264 to accurately tag and uniquely identify different segments within a document.

During the training phase, the predicted tags for segments in each document predicted by AI model 262 are compared to labels/tags for segments of the document in the training data 265 to continuously improve the AI model 264. This allows the AI model 264 to learn the correct classifications/tags for segments of the documents. In one or more embodiments, the AI model 264 may begin training, as discussed herein, from a pretrained model which is a model that has been trained on a large dataset and can be used as a starting point for other tasks. Once trained, the AI model 264 is configured to receive segments of a document and output the predicted tags for the segments in the document.

In one or more embodiments, the functions of the AI model 262 and the AI model 264 can be combined into AI model 266. For example, the document 208 can be input into AI model 266 which then outputs the segments and their corresponding tags for the document 208 based on a combination of the training discussed herein. In this case, the AI model 266 is trained on a combination of the training data 263 and 265.

In an example scenario, the AI model 264 and/or AI model 266 can predict the following example tags:

Tag 1: Header: "Introduction" (which can be tagged as Header 1)

Tag 2: Chapter 1 (which can be tagged as Section 1)

Tag 3: Confidential data (which can be tagged as Confidential 1)

Tag 4: Chapter 2 (which can be tagged as Section 2)

Tag 5: Appendix (which can be tagged as Appendix 1).

At block 308, the software 204 of computer system 202 is configured to render the tags of the document 208 to the document owner. The tags for each segment of the document 208 can be visually displayed in a graphical user interface to the document owner. As an example, each segment can be individually highlighted with its own tag (and color), such that the document owner can visually see each segment and its corresponding tag. The tag can have a unique numerical value and unique name indicative of the corresponding segment. In the graphical user interface, the document owner can scroll through each segment with its tag and accept or reject each tag. For example, selectable objects can be displayed in which the document owner may choose to accept or reject each tag presented by making a selection of the selectable objects. It should be appreciated that there are various configurations for accepting or rejecting tags, in addition to making selections in a graphical user interface.

At block 310, the software 204 of computer system 202 is configured to check whether the suggested tags were accepted for segments of the document 208 (as well as if the segments were accepted). If (Yes) the suggested tags were accepted, the flow proceeds to block 314. If changes or updates were made to the tags and/or segments, the software 204 is configured to present the document 208 to the user for further customization of the tags and segments and to receive the updated tagging at block 312. In one or more embodiments, the document owner reviews the AI suggested tags and adjusts the tags as desired. In some cases, the document owner may combine some segments and add new segments with their respective tags. It is noted that although blocks 308, 310, and 312 are shown separately, any of the blocks 308, 310, and 312 may be implemented concurrently.

At blocks 314 and 316, the software 204 of computer system 202 is configured to update the document ID with the tags and generate an access control table 280 for the document ID assigned to the document 208. The software 204 is configured to link the tags to the respective segments in the document 208.

Figure 4:
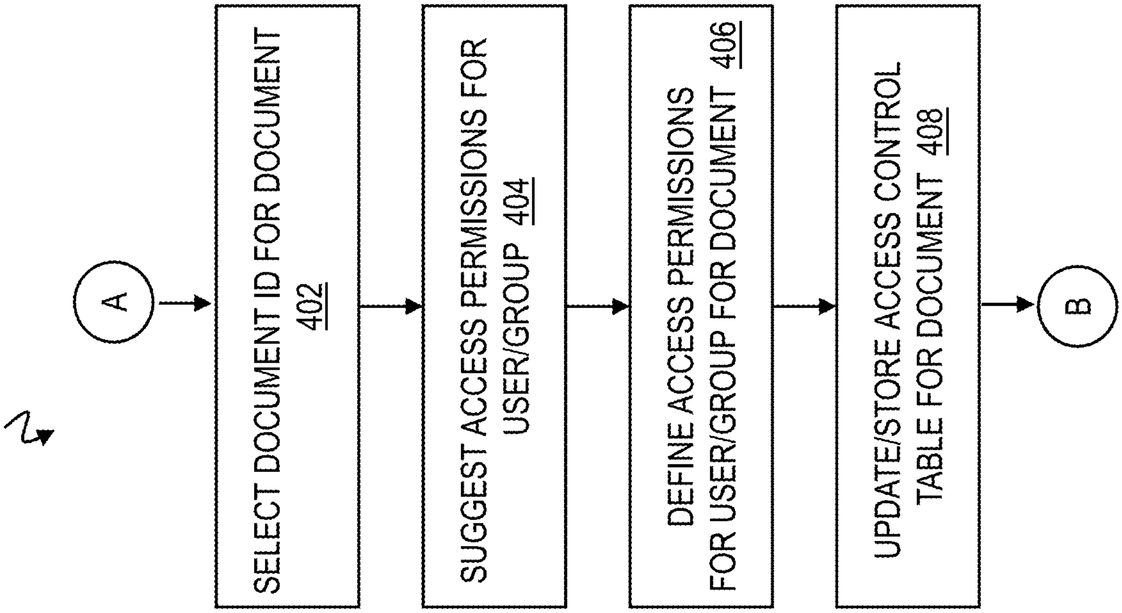
FIG. 4 is a flowchart of a computer-implemented method for dynamically providing granular level document security with role-based access according to one or more embodiments of the present invention.

FIG. 4 depicts a flowchart of a computer-implemented method 400 illustrating how the document owner defines access permissions for tags, which includes specifying the users and/or groups that can access specific segments using document ID and associated tags, according to one or more embodiments. The computer-implemented method 300 can be executed by the computer system 202. Reference can be made to any figures discussed herein.

At block 402 of the computer-implemented method 400, the software 204 of computer system 202 is configured to receive a selection of the document ID for the document 208. Accordingly, the software 204 initiates or retrieves the access control table 280 having the document ID for the document 208.

At block 404, the software 204 of computer system 202 is configured to automatically suggest predefined permissions for users and groups for the tags based on job roles, which can be accepted or denied by the document owner, and define access permissions for users and groups for the document 208 at block 406. The document owner inputs access for each user or group, which could be a predefined group of users, for each tag corresponding to a segment of the document 208. As an example, user A, representing a manager, is granted access to tags corresponding to the segments for Header 1, Section 1, Section 2, and Appendix. User B, representing an analyst, is granted access to tags corresponding to the segments for Header 1, Section 1, and Section 2. User C, representing an auditor, is granted access to tags corresponding to the segment for Header 1, Section 1, Confidential 1, Section 2, and Appendix 1. To enhance the efficiency of this process, the software 204 includes the automated permission suggestion feature based on job roles. When a user is selected, the software 204 references a role-based access control (RBAC) database 290 that contains predefined permission sets associated with various job roles. For instance, when a user is identified as a "manager," the software 204 automatically suggests access to segments typically required by managers, such as headers, key sections, and appendices. Similarly, for an "analyst," the software 204 may suggest access to headers and analytical sections, while for an "auditor," the software 204 may suggest access to headers, confidential sections, and appendices. Using a graphical user interface of the software 204, these automatic suggestions can be adjusted by the document owner to ensure precise access control tailored to individual needs.

At block 408, the software 204 of computer system 202 is configured to update and store the permissions for users or groups corresponding to each tag in the access control table 280 for the document ID of the document 208. The user ID, group ID, etc., can be inserted for each tag in the access control table 280, which means the permission is granted to access the corresponding segment for that tag. When the user ID, group ID, etc., is not provided for a tag, the software 204 restricts access to the segments corresponding to that tag. The user ID and group ID are identifications of end user. The end users A, B, C, and N each have unique user IDs. A group ID collectively represents a groups of user IDs for end users. Any of the end users A, B, C, and N can be part of one or more groups collectively having their own group IDs, such that a group ID can be input into the access control table 280 for a tag without having to individually input a user ID for each member of the group.

Figure 5:
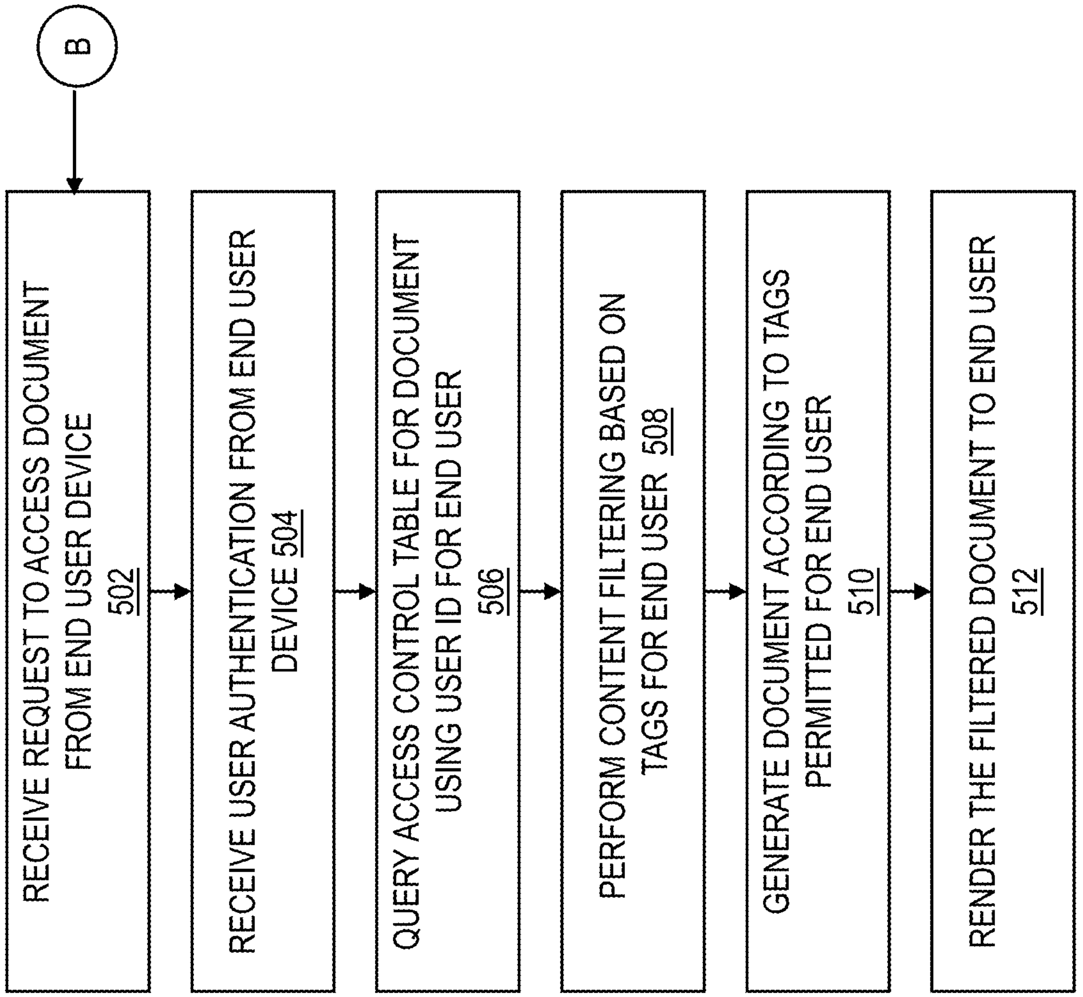
FIG. 5 is a flowchart of a computer-implemented method for dynamically providing granular level document security with role-based access according to one or more embodiments of the present invention.

FIG. 5 depicts a flowchart of a computer-implemented method 500 illustrating how end users receive access to and interact with the document according to one or more embodiments. As discussed herein, user access to the document is based on permissions defined by the document owner in the access control table 280 in order to provide the desired functionality to the end user.

At block 502, the software 204 of computer system 202 is configured to receive a request to access the document 208 from an end user device, such as computer system 240. For example, the end user A utilizing computer system 240A can request access to the document 208 through a secure interface. In order to connect with the computer system 202, the end user A may use a portal, web browser, URL, etc.

At block 504, the software 204 of computer system 202 is configured to authenticate the end user after receiving login information. The software 204 may receive a user ID, a group ID, a password, etc. The software 204 can call, include, and/or employ authentication software and services to authenticate the end user. The user ID or group ID is the identification utilized to determine permission associated with the tags in the access control table 280.

At block 506, after the end user is authenticated, the software 204 of computer system 202 is configured to query the access control table 280 for the document 208. With the document ID, the software 204 can use the user ID and/or the group ID to search the access control table 280 for tags the user is permitted to access based on their user ID or group ID (i.e., identification).

At blocks 508 and 510, the software 204 of computer system 202 is configured to perform content filtering based on the tags for which the end user has permission to view and generate the document 208 according to the tags permitted for the end user. As noted herein, the tags correspond to segments of the document 208. For the tags in which the end user was not given permission in the access control table 280, the software 204 is configured to remove the corresponding segments from the document 208, such that the segments for the tags permitted by the end user remain in the document 208. It should be appreciated that there are various methods to remove or obstruct the tags for which the end user is not permitted to view their corresponding segments. In one or more embodiments, the tags can be utilized to encrypt the segments, and the segments are decrypted for tags that the end user is given permission to access while the segments remain encrypted for tags that the end user is not given permission to access. In one or more embodiments, the software 204 may include, call, and/or employ editing software 282 that can be utilized to remove or delete the segments corresponding to tags that the end user is not given permission to access, while the segments for tags that the end user is permitted to access remain visible in the document 208. This results in the document 208 having filtered content as the segments that the end user has permission to access.

At block 512, the software 204 is configured to cause the document 208 having filtered content (i.e., displaying (only) the segments corresponding to the permitted tags) to be rendered to the end user on the computer system 240. For example, the software 204 can transmit the document 208 to the computer system 240 and/or present the document 208 in the portal of a user interface on the computer system 240 such that the filtered content is rendered on the user interface, while unauthorized segments remain hidden. For example, after assembling the filtered content of the document 208, the computer system 202 can cause the document 208 to display on computer system 240 segments for Header 1, Section 1, and Section 2 while not displaying segments for tags in which permission is not granted. For example, after assembling the filtered content of the document 208, the computer system 202 can cause the document 208 to display on computer system 240 segments for pages 1-3, 5, and 6 corresponding to tags with permission granted, while pages 4 and 7 corresponding to restricted tags are not shown. It should be appreciated that that the end user A views only the segments of the document 208 he/she is permitted to access, thereby maintaining the security and integrity of the document 208.

FIG. 6 is a block diagram of an example access control table having a document ID, tags corresponding to segments, as well as users or groups. In this example, an entry for a given tag, such as tag 1: XYZ, has fields for users or groups that are granted permission to access the given tag. When the user ID or group ID for a given end user is not present in the user ID field or group ID field, the end user cannot access the given tag for the corresponding segment.

Figure 7:
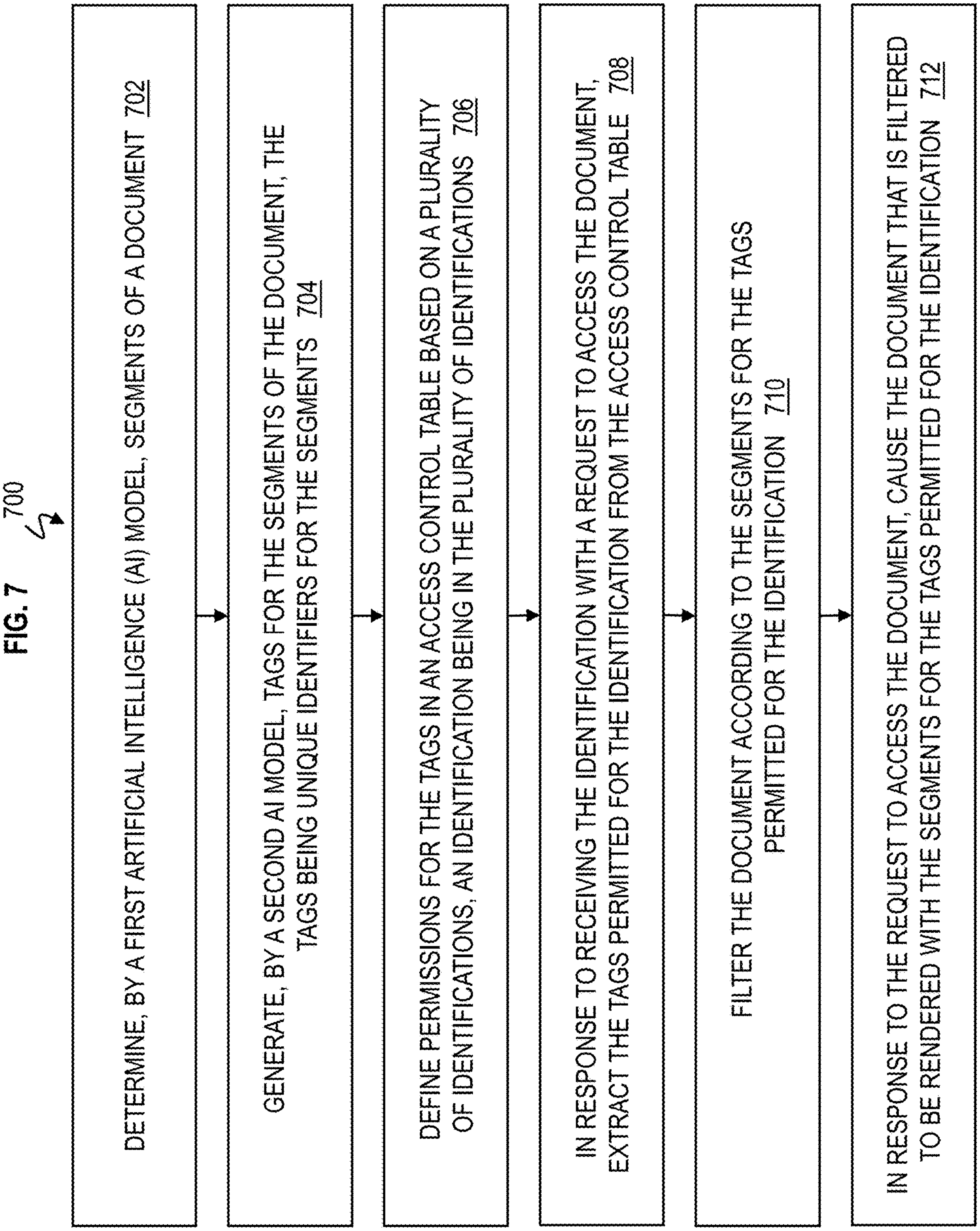
FIG. 7 is a flowchart of a computer-implemented method for dynamically providing granular level document security with role-based access according to one or more embodiments of the present invention.

FIG. 7 is a flowchart of a computer-implemented method 700 for dynamically (in real-time or near real-time) providing granular level document security with role-based access according to one or more embodiments. The computer-implemented method 700 can be executed by the computer system 202 and cause actions to be performed on the computer systems 240. Reference can be made to any figures discussed herein.

At block 702 of the computer-implemented method 700, the computer system 202 is configured to determine, by a first artificial intelligence (AI) model 262, segments of a document 208. At block 704, the computer system 202 is configured to generate, by a second AI model 264, tags for the segments of the document 208, the tags being unique identifiers for the segments. At block 706, the computer system 202 is configured to define permissions for the tags in an access control table 280 based on a plurality of identifications, an identification (e.g., user ID, group ID, etc.) being in the plurality of identifications. At block 708, in response to receiving the identification with a request to access the document, the computer system 202 is configured to extract the tags permitted for the identification from the access control table 280. At block 710, the computer system 202 is configured to filter the document 208 according to the segments for the tags permitted for the identification. At block 712, in response to the request to access the document, the computer system 202 is configured to cause the document 208 that is filtered to be rendered with the segments for the tags permitted for the identification on the computer system 240.

Further, the computer system 202 is configured to present the tags and the segments for acceptance, for example, by the document owner, and receive acceptance of the tags and the segments for the document 208. The computer system 202 is configured to present/suggest the tags and the segments for acceptance and receive updates to the tags and the segments for the document 208. The filtering the document 208 according to the segments for the tags permitted for the identification comprises removing the segments for the tags in which access is restricted, thereby generated a filtered document 208. The filtering the document 208 according to the segments for the tags permitted for the identification comprises keeping the segments for the tags in which access is permitted, thereby generated a filtered document 208.

Additionally, the plurality of identifications comprises one identification corresponding to a group of end users. The plurality of identifications comprises one (another) identification corresponding to an end user.

Although not required, various technical solutions and technical effects can be provided by one or more embodiments. As distinct from existing technologies, one or more embodiments offer granular control over access at a page or section level rather than the document level. AI-based tagging presents the ability to divide documents as required by the document owner using a tagging mechanism and the access control table. The system allows for precise access management based on specific tags associated with user roles. This results in enhanced security and efficiency by ensuring that users access only the information relevant to their needs and authorized permissions.

This page-level access control is a technical improvement over traditional document security solutions in which the improved security and privacy restrict access to only the necessary portions of the document. The system provides a more detailed and flexible approach to document access control. After using an AI workflow to analyze and tag document segments, the system incorporates a structured access control table with fields for document ID, user ID, group ID, and tag, and mechanisms for managing access permissions.

The process for securing the segments of the document includes defining the access control table for the document, populating the access control table with relevant data, and mapping user information. This comprehensive approach ensures a smooth transition and effective implementation of the page-level access control system, without requiring any system upgrade, additional hardware, or operating system update, thereby making management less complex as compared to traditional approaches.

In one or more embodiments, the AI model 262, the AI model 264, the AI model 266 can include various engines/classifiers and/or can be implemented on a neural network. The features of the engines/classifiers can be implemented by configuring and arranging the computer system 202 to execute machine learning algorithms. In general, machine learning algorithms, in effect, extract features from received data (e.g., the complete message formed of segmented messages) in order to "classify" the received data. Examples of suitable classifiers include but are not limited to neural networks, support vector machines (SVMs), logistic regression, decision trees, hidden Markov Models (HMMs), etc. The end result of the classifier's operations, i.e., the "classification," is to predict a class (or label) for the data. The machine learning algorithms apply machine learning techniques to the received data in order to, over time, create/train/update a unique "model." The learning or training performed by the engines/classifiers can be supervised, unsupervised, or a hybrid that includes aspects of supervised and unsupervised learning. Supervised learning is when training data is already available and classified/labeled. Unsupervised learning is when training data is not classified/labeled so must be developed through iterations of the classifier. Unsupervised learning can utilize additional learning/training methods including, for example, clustering, neural networks, deep learning, k-nearest neighbors, Bayesian methods, and the like.

In one or more embodiments, the engines/classifiers are implemented as neural networks (or artificial neural networks), which use a connection (synapse) between a pre-neuron and a post-neuron, thus representing the connection weight. Neuromorphic systems are interconnected elements that act as simulated "neurons" and exchange "messages" between each other. Similar to the so-called "plasticity" of synaptic neurotransmitter connections that carry messages between biological neurons, the connections in neuromorphic systems such as neural networks carry electronic messages between simulated neurons, which are provided with numeric weights that correspond to the strength or weakness of a given connection. The weights can be adjusted and tuned based on experience, making neuromorphic systems adaptive to inputs and capable of learning. After being weighted and transformed by a function (i.e., transfer function) determined by the network's designer, the activations of these input neurons are then passed to other downstream neurons, which are often referred to as "hidden" neurons. This process is repeated until an output neuron is activated. Thus, the activated output neuron determines (or "learns") and provides an output or inference regarding the input.

Training datasets (e.g., training data 263 and training data 265) can be utilized to train the machine learning algorithms. The training datasets can include historical data and the respective labels, as part of supervised learning. For the preprocessing, the raw training datasets may be collected and sorted manually. The sorted dataset may be labeled (e.g., using the Amazon Web Services® (AWS®) labeling tool such as Amazon SageMaker® Ground Truth). The training dataset may be divided into training, testing, and validation datasets. Training and validation datasets are used for training and evaluation, while the testing dataset is used after training to test the machine learning model on an unseen dataset. The training dataset may be processed through different data augmentation techniques. Training takes the labeled datasets, base networks, loss functions, and hyperparameters, and once these are all created and compiled, the training of the neural network occurs to eventually result in the trained machine learning model (e.g., trained machine learning algorithms). Once the model is trained, the model (including the adjusted weights) is saved to a file for deployment and/or further testing on the test dataset.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
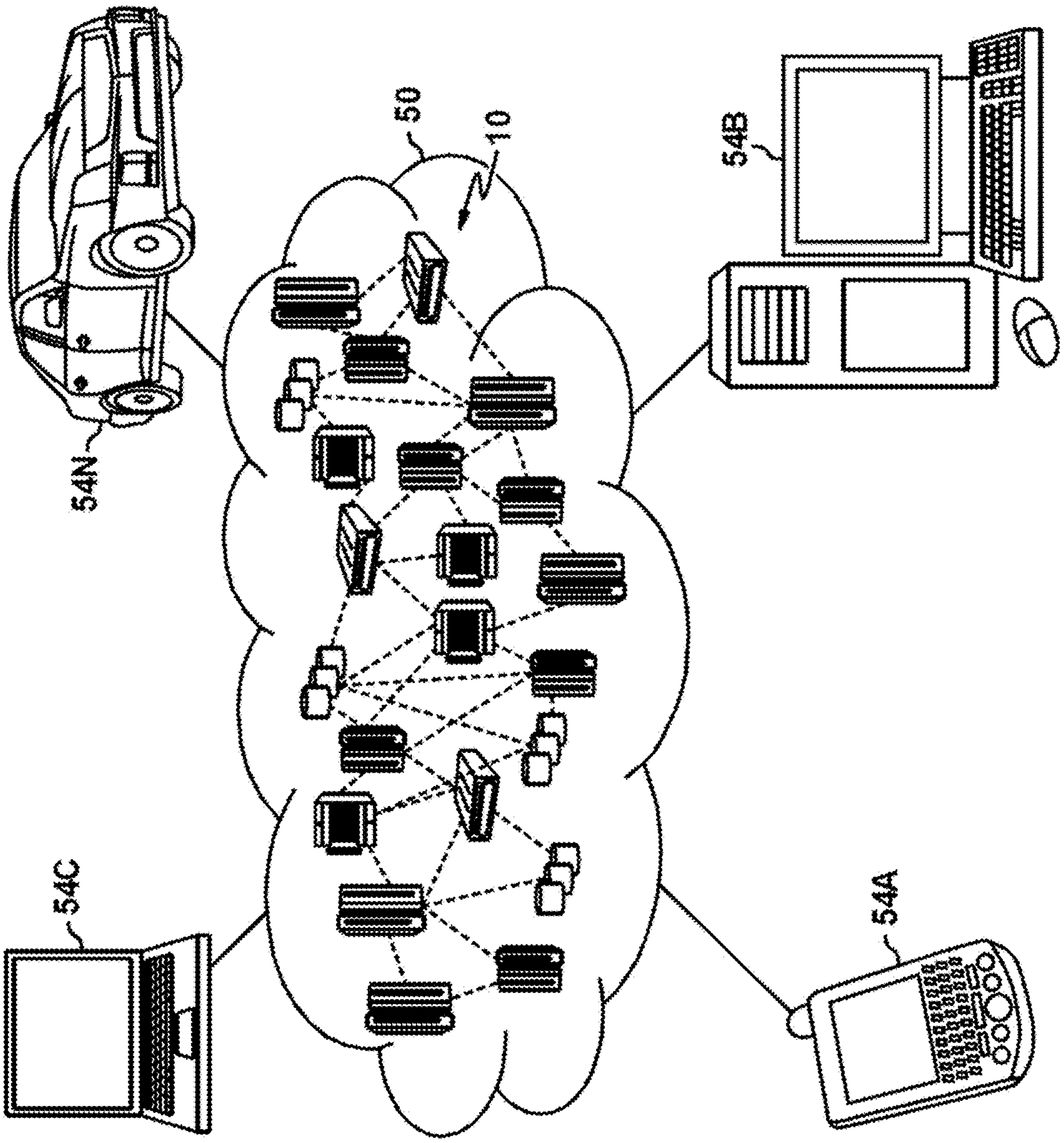
FIG. 8 depicts a cloud computing environment according to one or more embodiments of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
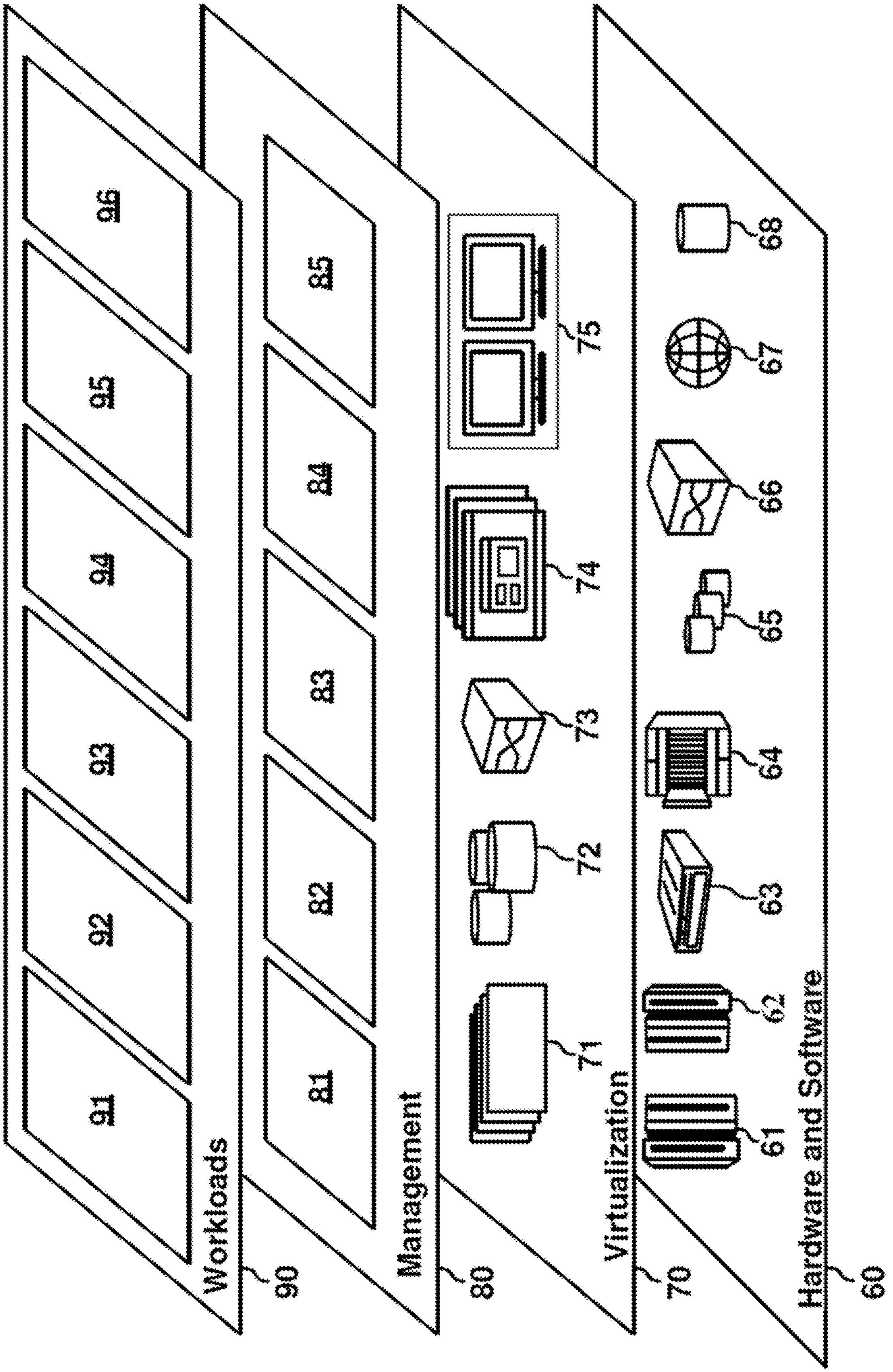
FIG. 9 depicts abstraction model layers according to one or more embodiments of the present invention.

Referring now to FIG. 9, a set of functional abstraction layers provided by cloud computing environment 50 (depicted in FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workloads and functions 96. One or more aspects of embodiments may be executed, at least in part, by workloads and functions 96. In one or more embodiments, the software 204, the AI model 262, the AI model 264, editing software 282, access control table 280, etc., can utilize, be executed as, and/or be integrated with workloads and functions 96.

Various embodiments of the present invention are described herein with reference to the related drawings.

Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted, or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:

determining, by a first artificial intelligence (AI) model, segments of a document, wherein the segments are contained within the document itself;

generating, by a second AI model, tags for the segments of the document, the tags being unique identifiers for the segments contained within the document;

defining permissions for the tags in an access control table based on a plurality of identifications, an identification being in the plurality of identifications;

in response to receiving the identification with a request to access the document, extracting the tags permitted for the identification from the access control table;

filtering the document according to the segments for the tags permitted for the identification; and in response to the request to access the document, causing the document that is filtered to be rendered with the segments for the tags permitted for the identification.

2. The computer-implemented method of claim 1, further comprising presenting the tags and the segments for acceptance; and receiving acceptance of the tags and the segments for the document.

3. The computer-implemented method of claim 1, further comprising presenting the tags and the segments for acceptance; and receiving updates to the tags and the segments for the document.

4. The computer-implemented method of claim 1, wherein the filtering the document according to the segments for the tags permitted for the identification comprises removing the segments for the tags in which access is restricted.

5. The computer-implemented method of claim 1, wherein the filtering the document according to the segments for the tags permitted for the identification comprises keeping the segments for the tags in which access is permitted.

6. The computer-implemented method of claim 1, wherein the plurality of identifications comprises one identification corresponding to a group of end users.

7. The computer-implemented method of claim 1, wherein the plurality of identifications comprises one identification corresponding to an end user.

8. A system comprising:

a memory having computer readable instructions; and one or more processors for executing the computer readable instructions, the computer readable instructions when executed cause the one or more processors to perform operations comprising:

determining, by a first artificial intelligence (AI) model, segments of a document wherein the segments are contained within the document itself;

generating, by a second AI model, tags for the segments of the document, the tags being unique identifiers for the segments contained within the document, wherein the segments are portions of the document, wherein the portions comprise at least one of a page, a chapter, a section, a paragraph, a sentence, or a graphic;

defining permissions for the tags in an access control table based on a plurality of identifications, an identification being in the plurality of identifications;

in response to receiving the identification with a request to access the document, extracting the tags permitted for the identification from the access control table;

filtering the document according to the segments for the tags permitted for the identification; and in response to the request to access the document, causing the document that is filtered to be rendered with the segments for the tags permitted for the identification.

9. The system of claim 8, wherein the one or more processors perform the operations further comprising presenting the tags and the segments for acceptance; and receiving acceptance of the tags and the segments for the document.

10. The system of claim 8, wherein the one or more processors perform the operations further comprising presenting the tags and the segments for acceptance; and receiving updates to the tags and the segments for the document.

11. The system of claim 8, wherein the filtering the document according to the segments for the tags permitted for the identification comprises removing the segments for the tags in which access is restricted.

12. The system of claim 8, wherein the filtering the document according to the segments for the tags permitted for the identification comprises keeping the segments for the tags in which access is permitted.

13. The system of claim 8, wherein the plurality of identifications comprises one identification corresponding to a group of end users.

14. The system of claim 8, wherein the plurality of identifications comprises one identification corresponding to an end user.

15. A computer program product comprising a computer readable storage medium having program instructions embodied therewith, the program instructions executable by one or more processors to cause the one or more processors to perform operations comprising:

determining, by a first artificial intelligence (AI) model, segments of a document, wherein the segments are contained within the document itself;

generating, by a second AI model, tags for the segments of the document, the tags being unique identifiers for the segments contained within the document;

defining permissions for the tags in an access control table based on a plurality of identifications, an identification being in the plurality of identifications;

in response to receiving the identification with a request to access the document, extracting the tags permitted for the identification from the access control table;

filtering the document according to the segments for the tags permitted for the identification; and in response to the request to access the document, causing the document that is filtered to be rendered with the segments for the tags permitted for the identification.

16. The computer program product of claim 15, further comprising presenting the tags and the segments for acceptance; and receiving acceptance of the tags and the segments for the document.

17. The computer program product of claim 15, further comprising presenting the tags and the segments for acceptance; and receiving updates to the tags and the segments for the document.

18. The computer program product of claim 15, wherein the filtering the document according to the segments for the tags permitted for the identification comprises removing the segments for the tags in which access is restricted.

19. The computer program product of claim 15, wherein the filtering the document according to the segments for the tags permitted for the identification comprises keeping the segments for the tags in which access is permitted.

20. The computer program product of claim 15, wherein the plurality of identifications comprises one identification corresponding to a group of end users and another identification corresponding to an end user.

* * * * *